United States Patent [19]

Morris et al.

[11] Patent Number: 4,837,753
[45] Date of Patent: Jun. 6, 1989

[54] METHOD AND APPARATUS FOR LOGGING A BOREHOLE

[75] Inventors: Steven A. Morris, Sand Springs; Houston B. Mount, II, Tulsa; John T. Penn, Wagoner County, all of Okla.

[73] Assignee: Amoco Corporation, Chicago, Ill.

[21] Appl. No.: 37,280

[22] Filed: Apr. 10, 1987

[51] Int. Cl.[4] .............................................. G01V 1/40
[52] U.S. Cl. ........................................ 367/69; 367/86
[58] Field of Search .............................. 367/69, 86, 25; 181/104, 105; 364/422

[56] References Cited

U.S. PATENT DOCUMENTS

| | | | |
|---|---|---|---|
| Re. 31,074 | 11/1982 | Nolte | 367/86 |
| 3,426,865 | 2/1969 | Henry | 367/86 |
| 3,668,619 | 6/1972 | Dennis | 367/69 |
| 4,415,895 | 11/1983 | Flagg | 340/856 |
| 4,463,378 | 7/1984 | Rambow | 367/69 |
| 4,524,433 | 6/1985 | Broding | 367/86 |
| 4,597,183 | 7/1986 | Broding | 33/125 W |
| 4,601,024 | 7/1986 | Broding | 367/86 |
| 4,691,307 | 9/1987 | Rambow | 367/65 |
| 4,740,930 | 4/1988 | Broding | 367/69 |

OTHER PUBLICATIONS

Moore et al., "Development of a New Borehole Acoustic Televiewer . . . ," Transactions, vol. 9, Part 2, 8/85.

Primary Examiner—Thomas H. Tarcza
Assistant Examiner—Ian J. Lobo

[57] ABSTRACT

Method and apparatus for logging a borehole of the type in which an acoustic energy signal scans the borehole wall at a plurality of different depths thereby generating signals reflected from a reflecting boundary which are indicative of the condition of the reflecting boundary. A downhole microcomputer generates a sync signal for firing a transducer thereby directing an acoustic pulse toward the borehole wall. The transducer is rotated by a stepper motor. The computer synchronizes the number of transducer pulses with the number of stepper motor pulses thereby generating a constant number of transducer pulses per motor revolution. Reflected acoustic energy generates an electrical pulse which is amplified and summed with a signal relating to the rotational orientation of the transducer and the occurrence of the transducer firing pulse. The summed signal provides information relating to the condition of the reflecting boundary and may be used to generate a video image thereof.

47 Claims, 8 Drawing Sheets 4,837,753

METHOD AND APPARATUS FOR LOGGING A BOREHOLE

BACKGROUND OF THE INVENTION

1. Field of the Invention

The present invention relates to methods and apparatus for logging a borehole and more particularly to such methods and apparatus in which acoustic energy pulses are transmitted from the central portion of the borehole toward the borehole wall in a plurality of radial directions and at a plurality of different depths thereby generating reflected acoustic pulses from a reflecting boundary which are indicative of the condition of the reflecting boundary.

2. Setting of the Invention

One type of device for logging a borehole to determine the characteristics of the surrounding formation is sometimes referred to as a borehole televiewer. Such a device includes a synchronous alternating current motor. The motor is received in a housing which may be lowered into a well bore. The housing includes a gear box and a number of additional gears and shafts for enabling the motor to rotate a transducer assembly mounted on one of the shafts. As the housing is raised or lowered in a well bore, alternating current is supplied to the motor via a cable which connects the housing to a generator at the earth's surface. As the transducer assembly is rotated by the motor, acoustic pulses emit therefrom along a radial borehole axis thereby helically scanning the borehole with such pulses. A portion of the energy from each acoustic pulse is reflected by a reflecting boundary adjacent the borehole along a radial axis back toward the transducer which detects the reflected energy. The reflecting boundary may be the radially inner surface of the uncased borehole or of the casing. Reflections may also be returned under appropriate conditions from deeper boundaries, for example, from the casing-borehole interface, or from an interface between formations in the ground surrounding the well bore. If logging is conducted in an uncased well, one reflecting boundary will be the borehole wall.

For each reflected acoustic pulse, an electrical pulse is generated which is related to the energy of the reflected acoustic pulse detected by the transducer. These pulses are amplified and applied to a cable for transmission to the earth's surface. At the surface the pulses are typically recorded and thereafter manipulated to produce a display of the formation surrounding the borehole.

Examples of logging systems which operate as described above are disclosed in U.S. Pat. No. 3,728,672 to Dennis et al. and in U.S. Pat. No. 4,463,378 to Rambow. Another prior art device which operates generally in accordance with the above-described principles includes a substantially cylindrical housing having a synchronous alternating current motor received therein. The motor includes an output shaft which is connected by a drive gear to an upper gearing mechanism that includes several gears which may be replaced to change the gearing ratio. Through several additional gears and shafts, the rotational output of the motor shaft is coupled to a transducer drive shaft which is coaxial with the housing.

The lower end of the transducer drive shaft has a gear mounted thereon which is engaged with a lower gearing mechanism that is coupled to a transducer support shaft. A pair of transducers are mounted on the support shaft and are rotated thereon under power of the motor. A rotary transformer is disposed between the support shaft and the radially inner surface of the housing. The transformer includes a rotor mounted on the support shaft and a stator mounted on the radially inner surface of the housing.

A cable connects the stator of the rotary transformer with electronics in the housing which provide signals to and receive signals from the transducers.

In operation, the device is suspended from a cable and lowered into a well bore adjacent an area of interest which is to be scanned. In addition to the support cable, a multi-conductor electrical cable provides communication between the electrical components in the device and circuitry located at the surface.

To initiate borehole scanning, alternating current is applied to the power lines in the electrical cable at the surface which are connected to the motor thus starting rotation of the motor shaft. The power is typically provided by a portable generator and is usually 60 cycle per second alternating current.

The motor drives the upper gearing mechanism which in turn rotates the transducer drive shaft. The transducer drive shaft drives the transducer support shaft via the lower gearing mechanism.

As the support shaft rotates, a periodic electrical pulse is applied to one of the transducers thereby generating an acoustic pulse which is transmitted radially from the device toward the borehole wall adjacent the transducer. The pulse is applied to the transducer via the rotary transformer. Acoustic energy is reflected by a reflecting boundary, such as the interface between the borehole and the surrounding formation, and is detected by the transducer which generates an electrical pulse related to the energy of the reflected acoustic pulse. This pulse appears on wires which connect the transducer to the rotor of the rotary transformer. The pulse is amplified by a downhole amplifier and transmitted to the surface via the electrical cable connecting the device to the circuitry at the surface. Accumulation of data so generated can be used to generate a display of the reflecting boundary.

When it is desired to change the speed of rotation of the transformer support shaft, the device must be raised to the surface to replace gears in the upper gearing mechanism in order to change the gear ratio between the motor shaft and the transducer drive shaft.

Several prior art references illustrate logging systems which operate as explained above. Some of these references show, e.g., FIG. 1 of U.S. Pat. No. 3,728,672 to Dennis et al., schematic illustrations of the prior art which delete the gear boxes and miscellaneous gears between the motor and the transducer assembly; however, such gear boxes and gears are present in the physical embodiments of all prior art devices known to the inventors of the instant invention.

The above-described prior art logging systems suffer from several disadvantages. The synchronous motor is typically powered by a portable generator at the well site and the frequency of the alternating current so generated may vary thereby varying the speed of the motor. The frequency of the electrical pulse which is generated by downhole electronics and applied to the transducer for generating the acoustic pulse may vary due to the typically high downhole temperatures to which the electronics are exposed. With the rotational speed and pulse frequency varying, the total number of acoustic pulses generated per revolution is subject to change and the log generated from such a system may be of uneven resolution. Also, when the number of pulses per revolution varies, error is introduced when the electrical pulses generated from the reflected acoustic pulses are manipulated to calculate volume surrounding the borehole.

As previously mentioned, the prior art devices incorporate a gear box plus additional gears between the shaft of the synchronous motor and the shaft on which the transducer assembly rotates. Such complex gear systems are necessary for three reasons. First, a synchronous motor has a vey low start-up torque and thus requires a fairly high gear ratio in order to begin rotation of the transducer assembly. Secondly, synchronous motors are typically designed to operate at a selected frequency, often 60 cycles per second, and any deviation therefrom substantially reduces the output torque. A synchronous motor which is powered by voltage at 60 cycles per second typically rotates at 1800 or 3600 rpm which would rotate the transducer assembly too rapidly and thus gearing is required to reduce the rotational speed of the transducer assembly. Finally, when it is desired to change the speed of transducer rotation in order to change the resolution or to change the rate at which the transducer is advanced along the borehole while maintaining the same resolution, the tool must be raised to the surface and the gears changed.

In prior art systems which utilize a synchronous motor, the gear system described must be used for the foregoing reasons. However, because of the friction inherent in the gear system and because of the gearing ratios which must be used to enable the motor to start and maintain rotation of the transducer assembly, the maximum rotational speed of the transducer assembly, and thus the maximum speed of advancement along the borehole axis, is subject to an unacceptably low upper limit. Thus, such logging consumes a great deal more time than other forms of borehole logging.

The use of prior art systems incorporating a synchronous motor and a gear system as described above necessitates raising the tool to the surface when it is desired to vary the rate of rotation of the motor. As discussed above, this is done by swapping gears in the tool thereby changing the gear ratio. The tool may then be again lowered into the borehole to commence scanning at the new rotation rate. It would be very desirable to have the capability of varying the rotation rate of the motor from the surface without having to raise the tool to the surface. This would eliminate the time and expense necessary to raise the tool to the surface and again lower the tool in the well bore to the point of interest.

It would also be desirable to be able to vary other operating characteristics of the tool from the surface. For example, rate of acoustic pulse scanning could be varied by varying the frequency at which the transducer firing pulses are generated. Further, it may be necessary or desirable to change the width of such pulses and to change other parameters of the downhole control circuitry. Prior art tools have not provided means for varying such operating characteristics from the earth's surface. As in the case of controlling motor rotation rate, it would be desirable to have the capability to vary such operating characteristics at the surface without having to raise the tool for adjusting the same.

There exists a need for a method and apparatus for generating a signal containing information relating to the state of a borehole of the type described in which the rotational speed of the transducer may be varied from the surface.

There also exists a need for such a method and apparatus in which the maximum rotational speed of the transducer is increased over that of prior art methods and apparatus.

There exists a further need for such a method and apparatus in which the rotational speed of the transducer is synchronized with the rate at which the transducer generates acoustic pulses.

There exists yet another need for such a method and apparatus in which operating characteristics of the downhole portion of the system, e.g., acoustic pulse width, acoustic pulse frequency, amplifier gain, etc., may be both monitored and adjusted at the surface.

SUMMARY OF THE INVENTION

The instant invention comprises a method and apparatus for generating a signal containing information relating to the state of a borehole in which acoustic energy pulses are transmitted from the central portion of the borehole toward the borehole wall in a plurality of radial directions and at a plurality of different depths thereby generating reflected acoustic pulses from a reflecting boundary which are indicative of the condition of the reflecting boundary. The method of the invention includes the steps of providing means for rotating at a rate dependent upon a speed control signal applied to the rotating means and providing a transducer assembly on the rotating means. Included in the transducer assembly is means for generating acoustic energy pulses ad means for receiving reflected acoustic pulses. A speed control signal is generated for a selected controlled rotation rate of the rotating means and is provided to the rotating means.

In one aspect of the invention the speed control signal may be varied responsive to a speed control command signal generated under operator control at the surface, thus varying the rotation rate of the rotating means. In other aspects of the invention, operating characteristics of the downhole portion of the apparatus, such as the rate and duration of acoustic pulses, amplifier gain, filter characteristics, transducer selection, and the like may be varied responsive to other command signals generated under operator control at the surface.

Apparatus for performing the steps of the method is also provided.

DETAILED DESCRIPTION OF THE PREFERRED EMBODIMENT OF THE METHOD AND APPARATUS OF THE INSTANT INVENTION

In one aspect, the present invention comprise a method for using a well logging device of the type having a motor, driven preferably by substantially square wave drive signals, and having a transducer assembly preferably mounted on a shaft of the motor. The steps of the method preferably include generating substantially square wave drive signals and providing the drive signals to the motor. A periodic pulsed firing signal is also generated which is provided to the transducer assembly thereby generating acoustic energy pulses. The motor is advanced along the axis of a well bore with the transducer assembly oriented to radially transmit the acoustic energy pulses from the central portion of the well bore toward the well bore wall. The transducer assembly receives from a reflecting boundary along a radial axis reflected acoustic pulses which are indicative of the condition of the reflecting boundary.

In another aspect of the invention, a downhole control circuit in the well logging device is in electrical communication with a surface control circuit which includes means for generating commands for varying operating characteristics of the well logging device, such as motor speed, firing signal frequency and pulse widths, gains, transducer selection, filter characteristics, and the like.

In yet another aspect of the invention, the periodic pulsed firing signals and the drive signals are synchronized and cooperate to generate a constant number of acoustic pulses per transducer revolution.

The apparatus of the invention may be used in performing the method of the instant invention.

Figure 1:
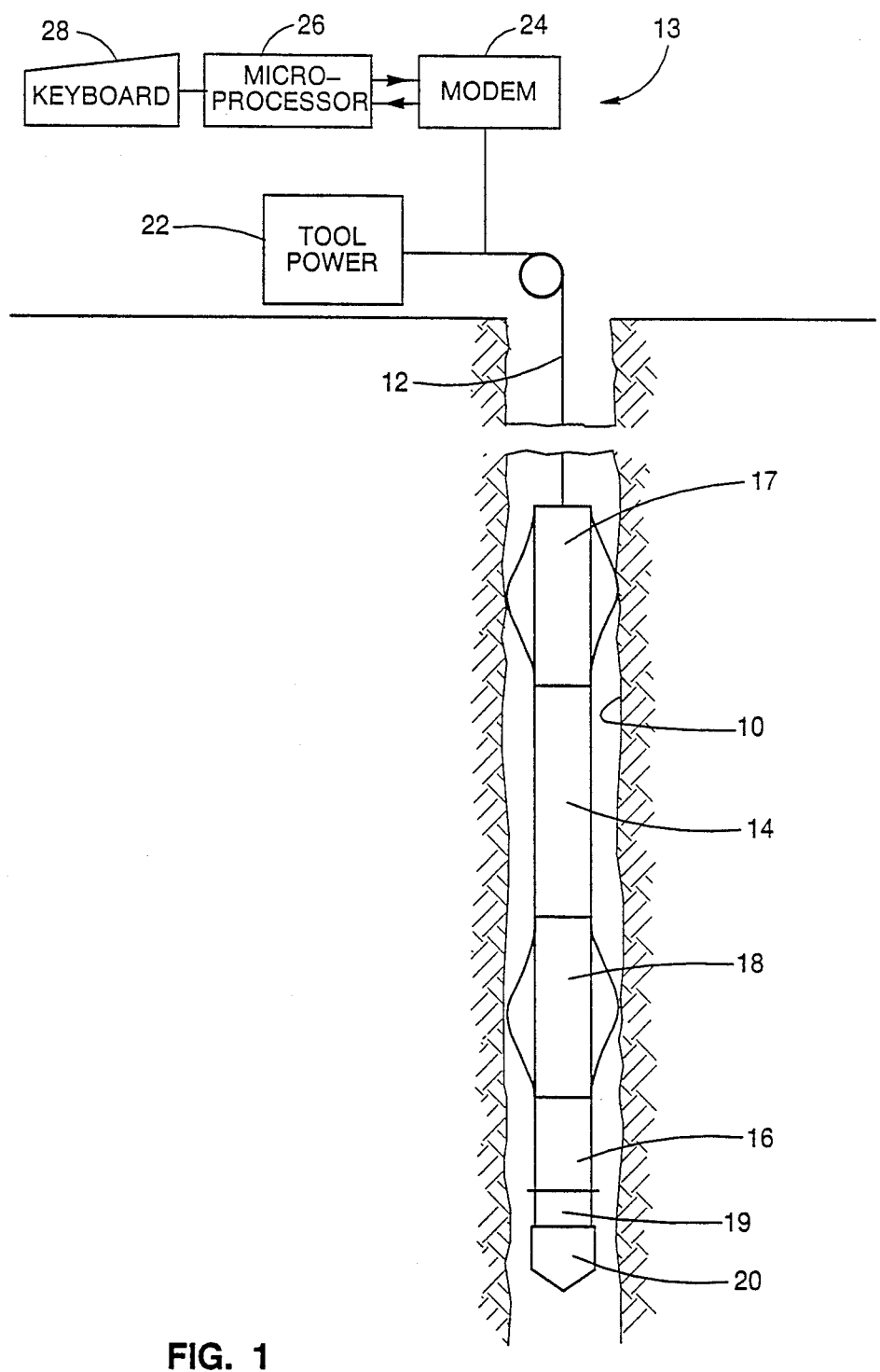
FIG. 1 is a schematic illustration of a logging system embodying the instant invention.

Turning now to FIG. 1, illustrated therein is a schematic view of a tool constructed in accordance with the apparatus of the instant invention suspended in a borehole 10 formed in formation 11. The tool is suspended on a cable 12 which includes electrical conductors therein for transmitting signals between the tool and a surface control circuit indicated generally at 13. The tool includes an electronics section 14 and a motor/transducer section 16. A pair of commercially available centralizers 17, 18 are provided in the tool to maintain the longitudinal axis thereof substantially coaxial with the well bore axis. Motor/transducer section 16 includes therein an annular window 19 and a protective nose piece 20.

Figure 3:
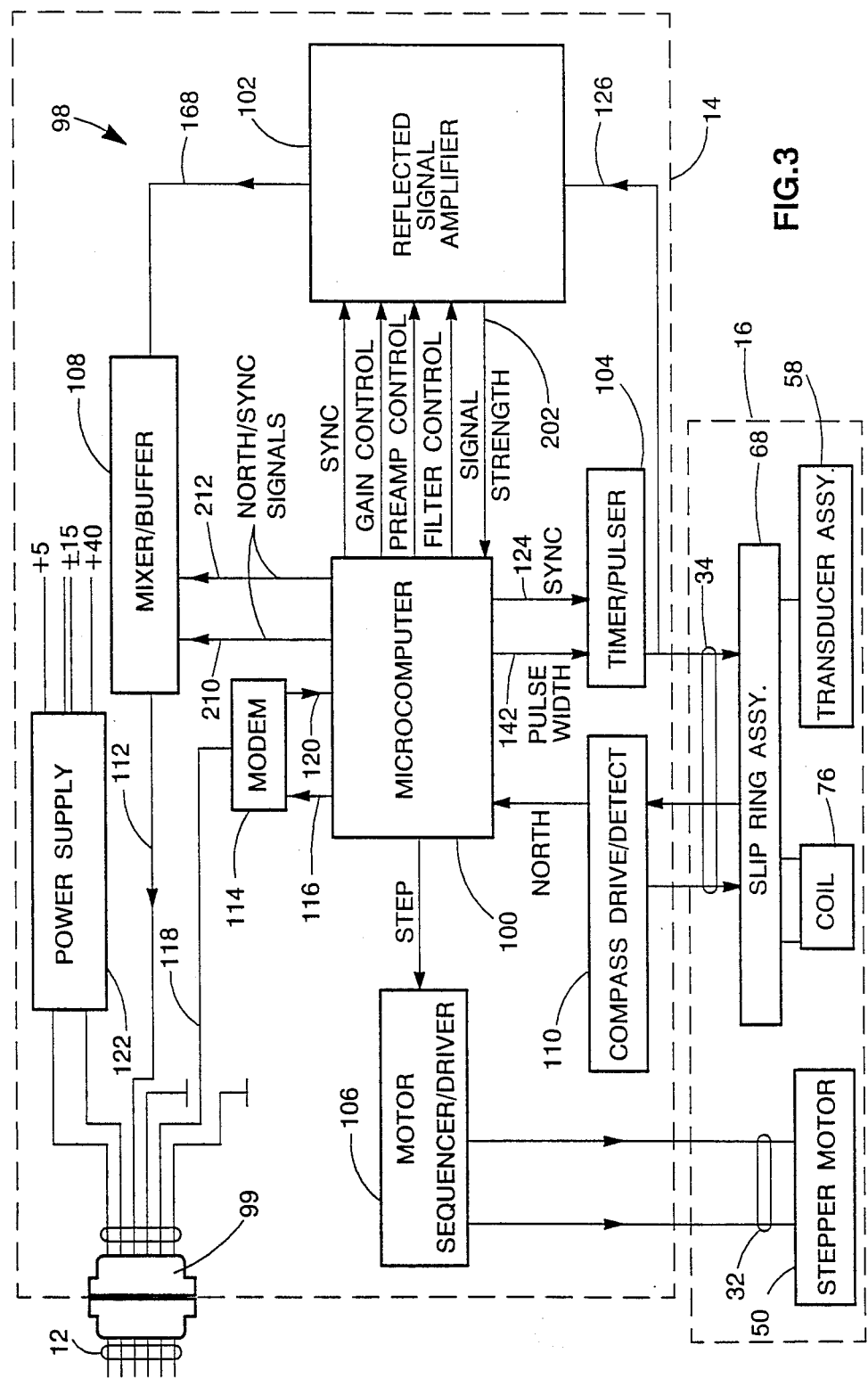
FIG. 3 is a schematic diagram showing the motor/transducer and electronics sections of FIG. 1.

Although not shown in FIG. 1, electronics section 14 includes downhole control circuitry which is shown schematically in FIG. 3 and which, among other things, generates the motor drive signal and the periodic pulsed firing signals which are applied to the transducer. Section 14 can be filled with air at atmospheric pressure and sealed to protect the downhole control circuitry from the fluids in borehole 10. Motor/transducer section 16 can be filled with oil at the hydrostatic pressure of the fluid in the well bore surrounding the tool and is hydraulically sealed from the fluids in the well bore. A bladder (not shown), the interior of which is in communication with the fluids in the well bore via a port (also not shown), can enable the fluid in section 16 to be maintained at the prevailing hydrostatic pressure.

In addition to cable 12 which places electronics section 14 in communication with surface control circuit 13, section 14 includes electrical leads for providing and receiving signals to section 16 as will be hereinafter described in more detail. Sealing means (not shown) can be used to permit the leads to pass therethrough while maintaining fluidic seals between sections 14, 16 and the environment.

Surface control circuit 13 includes therein a tool power circuit 22 and a commercially available modem 24. Tool power circuit 22 provides alternating current to electronic section 14 which is converted by a commercially available power supply therein to the DC voltage level necessary to operate the electronics in section 14. Modem 24 transmits signals both to and from a microprocessor 26. As will be hereinafter explained in more detail, operator-generated commands made at a keyboard 28 cause microprocessor 26 to produce signals which are transmitted by modem 24 on cable 12 to electronics section 14. As will also be later explained, certain signals generated by the electronics in section 14 are applied to cable 12 and are transmitted by modem 24 to microprocessor 26.

Figure 2:
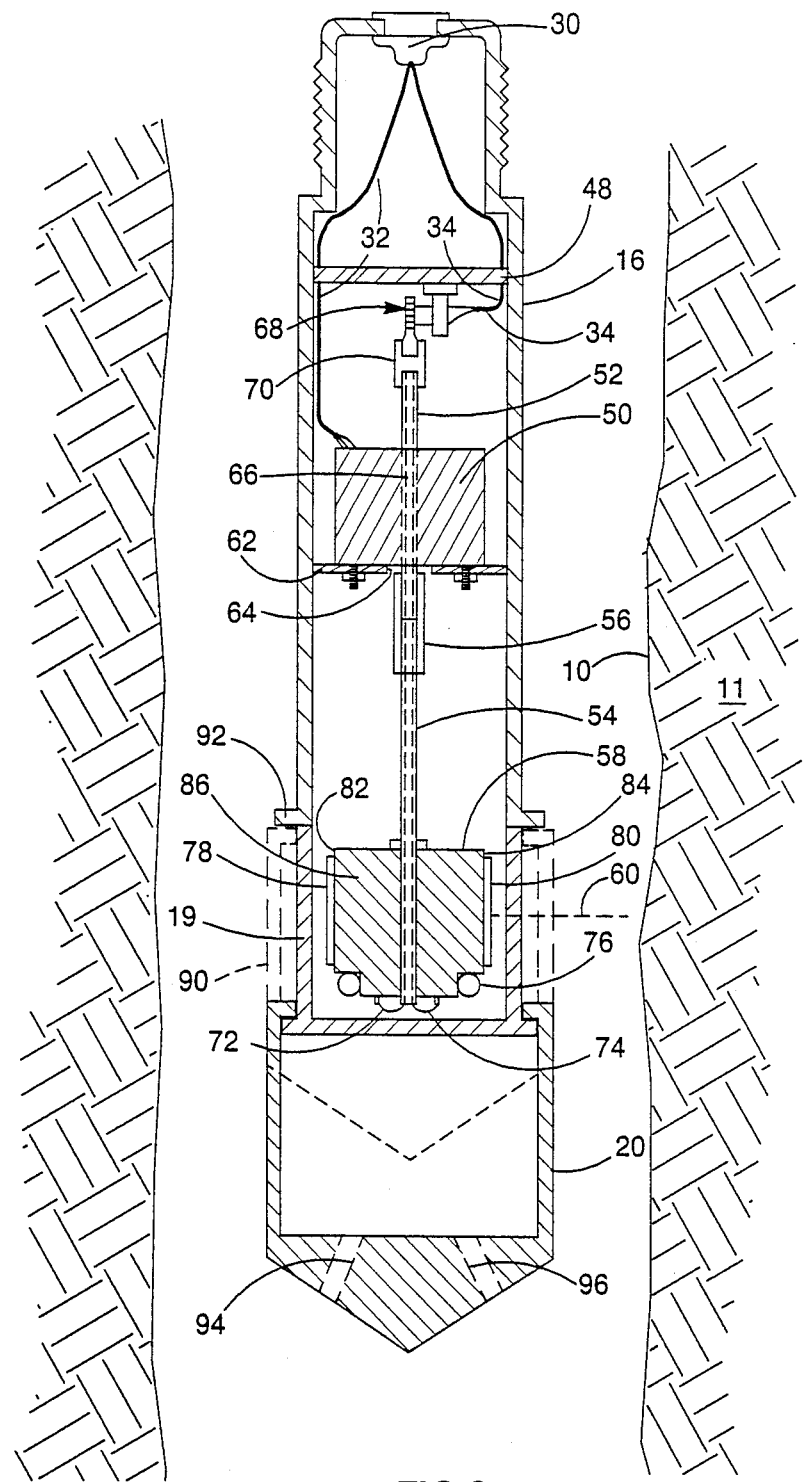
FIG. 2 is a schematic cross-sectional view of the motor/transducer section of FIG. 1.

Referring now to FIG. 2, illustrated therein is a schematic view of motor/transducer section 16. Section 16 includes an electrical connector 30 for providing and receiving signals from electronics section 14. For illustrative purposes, a cable 32 provides drive signals, such being also referred to herein as speed control signals, to a stepper motor 50 and a cable 34 provides signals to and receives signals from a transducer 78 or a transducer 80 and an orientation pulse generating means or coil assembly 76. For example, cable 32 can be connected to a commercially available stepper motor 50, such being also referred to herein as rotating means, and can provide electrical drive signals from the control circuit in housing 14 to the stepper motor. Other direct drive motors can of course also be used.

Stepper motor 50 is driven by electrical drive signals from section 14 preferably comprising substantially square wave drive signals. Each pulse of the square wave drive signals causes the motor shaft to advance by a substantially constant angular amount. When the motor is first started, the frequency of the square waves applied thereto from section 14 is preferably linearly increased until a selected rotational speed is achieved. At low speeds, for example, preferably below about two revolutions per second, the shaft moves in discrete angular amounts; however, at higher speeds, the momentum of the shaft causes shaft movement to be substantially continuous but still directly related to the frequency of the square wave voltage applied to the motor. The output torque of the motor is substantially constant between approximately 3 and 30 revolutions per second.

Stepper motor 50 includes a shaft 52 which rotates responsive to drive signals supplied to the stepper motor as described above and which extends both upwardly and downwardly from the body of stepper motor 50. Shaft 52 is connected to a shaft extension 54 by a coupling 56 so that the transducers rotate at the same rate as shaft 52. Mounted on the lower end of shaft extension 54 is a transducer assembly 58 which is referred to herein as a means for generating acoustic energy pulses and means for receiving reflected acoustic pulses.

Broadly stated, the tool operates in the following manner. The control circuit in section 14 generates both substantially square wave drive signals and periodic pulsed firing signals, the latter also referred to herein as signals controlling the rate of acoustic energy pulsing. The drive signals are provided to stepper motor 50 (via cable 32), the shaft of which rotates at a constant speed selected, for example, between approximately 3 and 30 revolutions per second. The periodic pulsed firing signal is provided to transducer assembly 58 which generates acoustic energy pulses that are transmitted from the transducer assembly toward the borehole wall in a plurality of radial directions, one of such transmission paths being indicated by axis 60 in FIG. 2. Reflected acoustic pulses which are reflected from a reflecting boundary, such as borehole 10 in formation 11, are received by transducer assembly 58 which generates an electrical pulse related to the acoustic energy of each reflected acoustic pulse. These electrical pulses are provided to the circuit in section 14 for amplification and rectification via cable 34 and are thereafter transmitted to the surface via wires in cable 12. As the transducer assembly generates acoustic pulses and rotates, tool 10 is advanced axially along the borehole thereby helically scanning the borehole with acoustic pulses, the reflections of which contain information relating to the condition of the formation surrounding the borehole.

Should it be necessary or desirable to alter the motor rotation speed or the frequency of acoustic pulsing, an appropriate command signal may be generated at the surface control circuit which is communicated to the downhole control circuit in section 14 via cable 12 and which effects the selected motor speed or acoustic pulsing change. Thus, such changes may be made by the operator at the surface without stopping borehole scanning and without raising the tool to the surface.

Continuing now the detailed description of the tool, stepper motor 50 is mounted on a circular plate 62 having a central bore 64 formed therethrough. Plate 62, like plate 48, is mounted on the interior of section 16. Stepper motor shaft 52 includes therein an axial bore 66 which is coaxial with the shaft and extends along the full length thereof.

The upper end of shaft 52 is connected to a commercially available slip ring means or assembly 68 by a coupling 70. The slip ring assembly provides a rotating electrical connection between the wires in cable 34 and a plurality of electrical conductors which are received in bore 66, two of which are illustrated as wires 72, 74. Shaft extension 54 includes an axial bore therethrough to accommodate wires 72, 74 which extend downwardly through bore 66 of the stepper motor shaft. Bore 66 and wires 72, 74 are referred to herein collectively as means for transmitting a signal through the motor shaft.

Coil assembly 76 is mounted on the lowermost end of transducer assembly 58. The coil assembly comprises a portion of a magnetometer, also referred to herein as means for generating an orientation pulse. The coil assembly interacts with the earth's magnetic flux lines and, in combination with circuitry in section 14, as will later be hereinafter more fully explained, produces a pulse each time the coil assembly rotates through a preselected rotational position.

Transducer assembly 58 includes transducers 78, 80, each of which is mounted on a vertical flat 82, 84, respectively, formed on a substantially cylindrical transducer mount 86. Transducers 78, 80 are each ultrasonic transducers, for example, piezoelectric transducers formed from lead metaniobate or the like. Each transducer includes a pair of electrical leads (not visible) which connect it to circuitry in electronics section 14 via the bores in shaft 52 and shaft extension 54 and through slip ring assembly 68. The electrical connections are schematically illustrated in greater detail in FIGS. 3 and following. Each transducer generates an acoustic energy pulse responsive to an electrical pulse applied to the transducer leads; however, only one transducer at a time is used to generate such pulses. In addition, when an acoustic pulse is reflected from a reflecting boundary, and when the reflected pulse strikes the transducer, a corresponding electrical pulse is generated by the transducer and appears on the transducer leads.

Window 19 is tubular in shape and extends around the circumference of the section adjacent transducer assembly 58. The window maintains the seal between oil-filled section 16 and the borehole environment while at the same time permitting acoustic energy to pass between the transducer assembly and the formation surrounding the borehole via the oil in the housing and the fluid in the borehole.

Nose piece 20 comprises a conical protective cap, shown in solid lines in a lower position and in dashed lines in an upper position, which is mounted on the lower end of section 16. If the lower end of nose piece 20 strikes an obstruction, such as a ledge or the bottom of the borehole, the nose piece is moved to its upper position and force is exerted on the nose piece through a housing shoulder 92 which abuts against the nose piece when it is in its upper position rather than through the relatively fragile acoustic window 19. The nose piece includes a pair of vents suggested by reference numerals 94, 96 which permit fluid communication between the borehole environment and the interior of nose piece 20. Vents 94, 96 permit fluid on the interior of the nose piece to exit through the vents in order to enable the nose piece to move from its lower position to its upper position.

Turning now to FIG. 3, shown therein is a schematic diagram of the downhole control circuit received within section 14, such being generally identified by the numeral 98. Also shown therein is cable 34 which connects circuitry in section 14 with slip ring assembly 68. In addition, cable 32 which connects circuitry in section 14 to stepper motor 50 is shown as well as the lines which are provided from the circuitry to a receptacle 99 which is electrically connected to surface control circuit 13 via cable 12 (shown in FIG. 1).

In circuit 98, a microcomputer 100 performs several functions. It generates a digital signal, referred to herein as a step signal, which is used to generate the substantially square wave drive signals that are applied to stepper motor 50 and thereby sets the speed of the stepper motor dependent upon the frequency of the step signal so generated. The microcomputer also generates sync pulses, which in turn are used to create the firing signals applied to transducer 58, thereby determining the frequency of the acoustic pulses emitted by the transducer. Since the microcomputer produces both the motor drive signals and the sync pulses, it can be programmed to synchronize the two thereby assuring a constant number of acoustic pulses emitted by the transducer for each revolution of the motor. Coil assembly 76 provides a pulse to the microcomputer each time the transducer assembly rotates by the same geographic orientation relative to the borehole. Thus, such a pulse is generated for each revolution of the motor shaft.

Microcomputer 100 controls various operating parameters of a reflected signal amplifier 102, which rectifies and amplifies an electrical signal generated by transducer assembly 58 when an acoustic pulse is reflected by a reflecting boundary back to the transducer. The amplified electrical signal is summed in a mixer/buffer circuit 108 with a signal generated by the microcomputer which includes the relative positions of the orientation pulse and the periodic pulsed firing signal. The summed signal is provided to the surface via electrical cable 12. This signal contains information indicative of the condition of the reflecting boundary and may be used to generate a video display of the formation.

As will later be more fully explained, a command signal specifying a selected controlled rotation rate of stepper motor 50 may be generated by an operator at surface control circuit 13. The command signal is communicated to microcomputer 100 which varies the frequency of the step signals used to generate the substantially square wave drive signals generated by motor sequencer/driver circuit 106.

In a similar manner, a command signal specifying a selected rate of acoustic energy pulsing may be operator generated at surface control circuit 13. The command signal is communicated to microcomputer 100 which varies the frequency of the periodic pulsed firing signal provided to transducer 58.

It can thus be seen that methods performed and apparatus constructed in accordance with the instant invention permit operator control at the surface of important characteristics of the downhole borehole scanning. Such control facilitates changing scanning rate without interrupting scanning and without raising the scanning tool to the surface.

Considering now in more detail the elements of electronic circuit 98, the microcomputer generates a periodic sync pulse, also referred to herein as a periodic pulsed firing signal, which is applied to a timer/pulser circuit 104. Circuit 104 generates an approximately 500 volt pulse, with a leading edge triggered by the leading edge of each sync pulse, which is supplied to either transducer 78 or transducer 80 on transducer assembly 58. The transducer emits an acoustic pulse responsive to the applied voltage which is directed toward the formation surrounding borehole 10 along axis 60 (in FIG. 2). Some of the acoustic energy is reflected by the surrounding formation back toward the transducer. Such reflected energy causes the transducer to generate a relatively small electrical pulse which appears on the input of reflected signal amplifier 102. As will later become more fully apparent, certain operating characteristics of amplifier 102 are controlled by the microcomputer. While the transducer is so pulsed, the microcomputer applies a step signal to a motor sequencer/driver circuit 106 which in turn applies a substantially square wave drive signal to stepper motor 50 thereby turning stepper motor shaft 52. It is to be appreciated that during transducer pulsing and stepper motor driving as described, the tool is moved axially along the borehole by raising cable 12 at the surface. Thus, the transducer helically scans the borehole with acoustic energy pulses and generates reflected signals responsive to acoustic energy reflected from a reflecting boundary.

The received electrical signals are amplified by amplifier 102 and are applied to the input of mixer/buffer circuit 108. Also applied to the input of the mixer/buffer circuit are microcomputer-generated north/sync signals which contain information relating to the frequency of pulsing by timer/pulser circuit 104 and information relating to the orientation pulse which is developed by a compass drive/detect circuit 110. Briefly stated, the compass drive/detect circuit generates an orientation pulse (labeled "north" on the diagram) each time coil 76 aligns with the earth's magnetic flux lines thereby providing a pulse each time the transducer assumes the same rotational position relative to the borehole. Such orientation coils and their theory of operation are well known and need not be further described here.

Mixer/buffer circuit 108 generates an output signal which is applied to a line 112. The output signal consists of a pulse indicative of the firing of, for example, transducer 80, followed by the electrical pulse relating to the acoustic energy of the reflected acoustic pulse. Another pulse appears in the output signal on line 112 when coil assembly 76 passes through the rotational position in which the north pulse is generated. The signals on line 112 are transmitted via cable 12 to surface circuit 13 where they may be manipulated to generate a video display of the borehole.

A modem 114 receives information from the microcomputer on a line 116 concerning various operating characteristics of the circuitry, as will later be hereinafter more fully explained, which is coded as serial binary data and applied to a line 118 for transmission to surface control circuit 13. Serial binary data may also be applied by surface control circuit 13, via cable 12, to line 118 and to modem 114 in order to generate microcomputer control signals on a line 120 for instructing the microcomputer to change various operating parameters of the control circuitry as will be later described in more detail.

A power supply 122 provides, for example, a ±5-volt line to various digital components in circuit 98, ±15-volts to various analog components in circuit 98, and a ±40-volt volt line to stepper motor sequencer/driver circuit 106. It is to be appreciated that each of the various power connections to the components in the various figures herein is not shown but that such connections will be apparent to a person having ordinary skill in the art.

Figure 4:
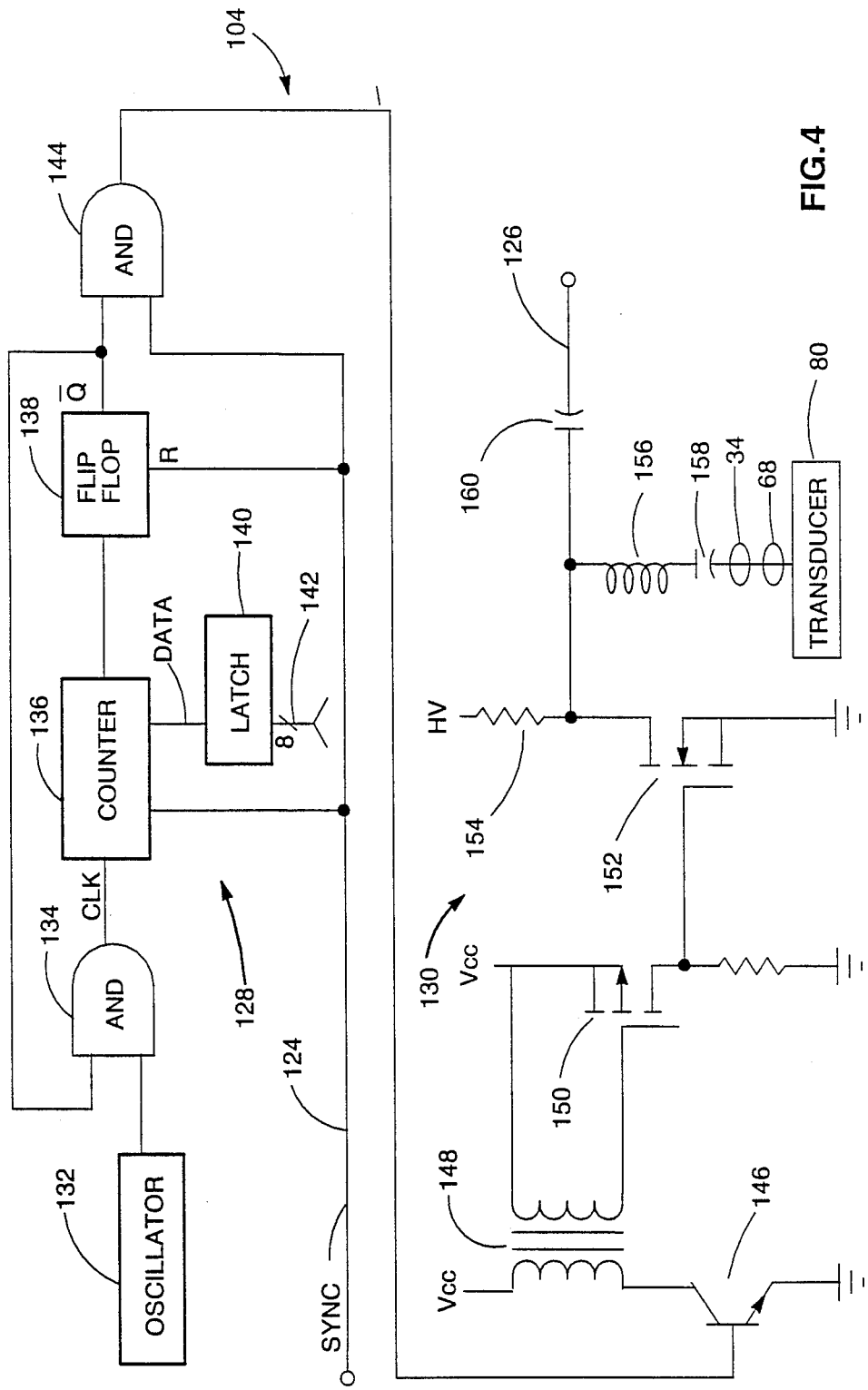
FIG. 4 is a schematic diagram of the timer/pulser circuit and transducer (in the transducer assembly) shown in FIG. 3.

Turning now to FIG. 4, shown therein is a more detailed diagram of timer/pulser circuit 104 of FIG. 3, such being also referred to herein as means for generating a periodic pulsed firing signal. Circuit 104 provides a periodic pulsed firing signal to transducer assembly 58 for generating acoustic energy pulses. Circuit 104 has an input on line 124, labeled "sync" in FIGS. 3 and 4, from microcomputer 100 and generates an output which is applied via slip ring assembly 68 to transducer 80. Circuit 104 includes therein a timer circuit indicated generally at 128 and a pulser circuit, indicated generally at 130. Broadly stated, timer circuit 128 generates a firing pulse having the same frequency as the sync pulse on line 124 and a pulse width defined by the timer circuit with the firing pulse being provided to pulser circuit 130. The firing pulse so generated by timer circuit 128 is used to generate a high voltage pulse which is applied to one of transducers 78, 80 for generating acoustic pulses having a frequency equal to that of the sync pulse on line 124 and a pulse width defined by timer circuit 128.

Considering now in more detail the structure and operation of timer circuit 128, a 50 megahertz oscillator 132 has the output thereof connected to an AND gate 134. The output of AND gate 134 is connected to a counter 136 which in turn has its output connected to a flip flop 138. A latch 140 has an output connected to the data input of counter 136 and an input on line 142 which is connected to an output of microcomputer 100 for controlling acoustic pulse width. The output of flip flop 138 is connected to an input of AND gate 134 and to an input of a second AND gate 144. The other input to AND gate 144 is the sync signal generated by the microcomputer, the leading edge of which, as will be seen, triggers the leading edge of a high voltage signal for application to one of transducers 78, 80 on transducer assembly 58.

In the operation of timer circuit 128, a number is selected by the microcomputer, which may be under command from surface control circuit 13 via modem 114, and is applied to bus 142 thereby storing the same in latch 140 thus controlling the width or duration of the periodic pulsed firing signal. The diagonal slash and adjacent numeral 8 on bus 142 designate an 8-line bus which connects the microcomputer with latch 140. When a sync pulse occurs, the number in the latch is loaded into counter 136 and flip flop 138 is preset thereby causing the $\overline{Q}$ output to go to a high level. Thus, the oscillator pulses are passed by AND gate 134 to counter 136 which begins counting upwardly from the number stored in the latch. When the counter 136 count exceeds its full capacity (overflow condition), the output of the counter changes thereby resetting flip flop 138 which causes the $\overline{Q}$ output to go to zero thereby inhibiting AND gate 134 from passing oscillator pulses to counter 136. During the time the counter is counting from the number stored in latch 140 to its overflow condition, the output of AND gate 144 is at a high level. When counter 136 overflows, the output of AND gate 144 goes to a low level. The pulses generated on the output of AND gate 144 define the width and frequency of the high voltage transducer pulse responsive to the sync signal and to the number on bus 142, both being provided by microcomputer 100.

Pulser circuit 130 includes a transistor amplifier 146 having the output of AND gate 144 as its input. The collector of the amplifier is in series with the input of an isolation transformer 148. A p-channel field effect transistor or FET 150 is used to drive an n-channel field effect transistor or FET 152, which when switched on places a high voltage across resistor 154, an inductor 156, a decoupling capacitor 158 and, for example, transducer 80. It should be noted that through digital switching circuitry (not shown) controlled by the microcomputer, either of transducers 78, 80, on transducer assembly 58, may be selected for high voltage pulsing by circuit 130. In the schematic of FIG. 4, transducer 80 is shown in configuration for having the high voltage pulse applied thereto.

A capacitor 160 connects the junction between resistor 154 and inductor 156 to line 126 which is applied to the input of reflected signal amplifier 102 (in FIG. 3). Thus, each time timer circuit 128 generates a pulse on the output of AND gate 144, a high voltage pulse is applied across transducer 80 thereby causing the transducer to emit an acoustic energy pulse along radial axis 60 which is reflected by a reflecting boundary, in this case the borehole wall, back to transducer 80. The reflected acoustic energy pulse causes the transducer to generate an electrical pulse which appears on line 126 which is the input to reflected signal amplifier 102.

As can be seen from the foregoing description, timer/pulse circuit 104 enables selective control of both the pulse width and the frequency of the periodic pulsed firing signal from surface control circuit 13. Selected changes of frequency and pulse width may be made at the surface without interruption of borehole scanning. For example, such control can be effected by a selected binary code as is known to those skilled in microcomputers.

Figure 5:
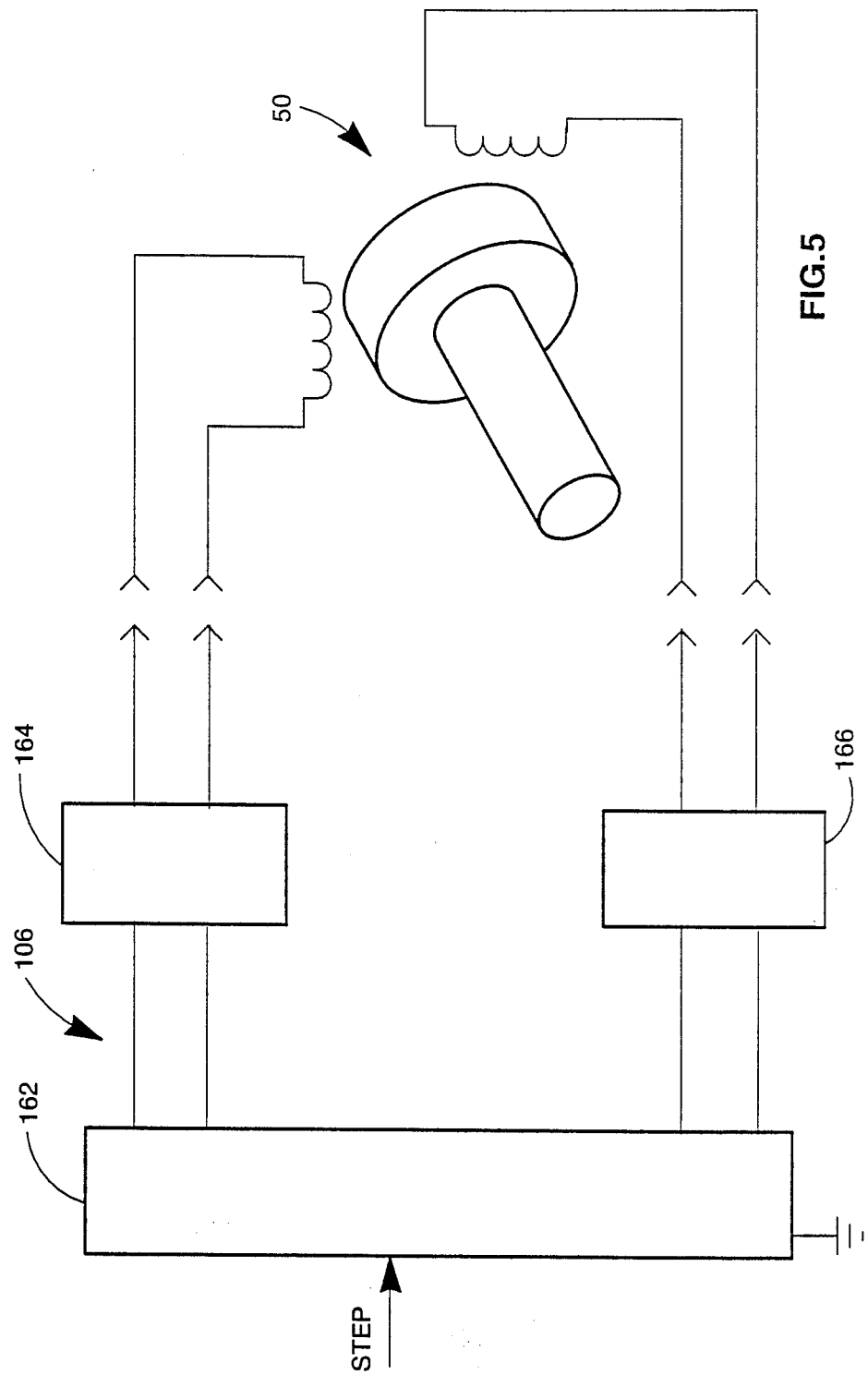
FIG. 5 is a schematic diagram of the motor sequencer/driver circuit shown in FIG. 3.

Turning now to FIG. 5, shown therein is motor sequencer/driver circuit 106 and stepper motor 50. Circuit 106 is referred to herein as means for generating substantially square wave drive signals. Circuit 106 includes an input provided by the microcomputer, labeled "step" in FIGS. 3 and 5, which is used to generate an output consisting of a pair of 40-volt square waves which are applied across the coils of motor 50 in proper phase relationship thereby driving the motor in a direction and at a rotational speed dependent upon the frequency of the step signal. As will be recalled, the microcomputer also generates the sync signal. The microcomputer can be programmed so that for any selected step and sync signal frequencies, a constant number of sync pulses is generated for each motor step pulse thus yielding a constant number of sync pulses, and therefore acoustic energy pulses, per motor revolution.

It should be appreciated that the step pulses generated by the microcomputer may be varied by command signals from surface control circuit 13 which are transmitted to the microcomputer via modem 114.

Motor sequencer/driver circuit 106 includes a commercially available programmable logic device 162. The logic device receives the step input from the microcomputer. Device 162 includes a first output which is connected to a motor driver 164 and a second output which is connected to a motor driver 166. Such motor drivers are commercially available and the manner of connection and use thereof are readily understood by a person having ordinary skill in the art.

Drivers 164, 166 can selectively apply a 40-volt pulse in proper phase relationship to each winding phase of motor 50 thereby causing the same to rotate in incremental steps, at least for low speeds, for example, below approximately two revolutions per second, at a rate dependent on the frequency of the pulses applied by drivers 164, 166. As will be recalled, at frequencies which drive the motor at higher speeds, for example, greater than about two revolutions per second, motor shaft rotation is substantially continuous due to the momentum of the shaft but still directly related to the frequency of the step signals.

Figure 6:
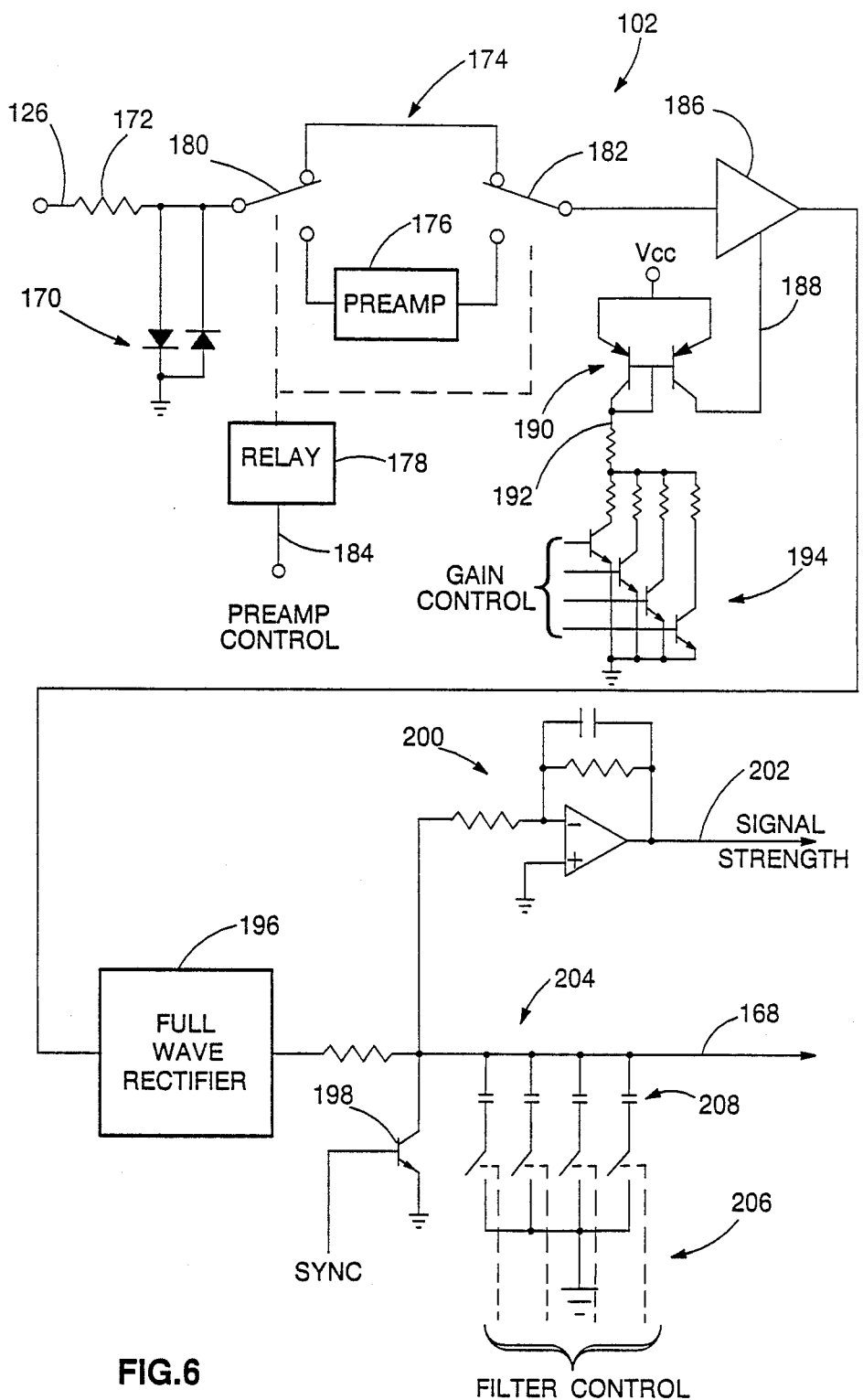
FIG. 6 is a schematic diagram of the reflected signal amplifier circuit shown in FIG. 3.

Turning now to FIG. 6, shown therein is a schematic diagram of reflected signal amplifier 102 (shown in FIG. 3). The amplifier includes an input, on line 126, which as can be seen in the schematic of FIG. 3, carries both the high voltage pulse which is applied to one of transducers 78, 80 and the relatively low voltage electrical pulse generated by the transducer when the reflected acoustic pulse strikes the transducer. The output of amplifier 102 is applied to line 168 (in FIGS. 3 and 6). As shown in FIGS. 3 and 6, amplifier 102 receives additional inputs from microcomputer 100, labeled "sync," "gain control," "filter control," and "preamp control." These inputs, as will later be hereinafter more fully described, control various operating characteristics of amplifier 102. In addition, the amplifier provides an output, labeled "signal strength" in FIGS. 3 and 6, to the microcomputer to enable the microcomputer to assess the operation of the amplifier and to make changes in the operating characteristics thereof if necessary. The microcomputer can be programmed to so operate by a person having ordinary skill in the art.

Considering in more detail the components which make up reflected signal amplifier 102, indicated generally at 170 is a diode clamp. Diode clamp 170 causes the high voltage pulses generated by pulser circuit 130 (in FIG. 4), which appear on line 126, to be placed across a resistor 172 thereby greatly reducing the voltage level which appears across the diode clamp. At the same time, the relatively small electrical pulse generated by transducer 80 in response to a reflected acoustic pulse is passed by the diode clamp to a low noise preamplifier circuit indicated generally at 174. Preamplifier circuit 174 includes a preamplifier 176 and a relay 178 which switches relay contacts 180, 182 responsive to a signal from the microcomputer on line 184. Thus, under control of the microcomputer, which as previously noted may act under control of commands from the surface transmitted via modem 114, signals passed by the diode clamp may be placed on the input of preamplifier 176 or passed to a commercially available broad band amplifier 186 without preamplification depending upon the condition of relay 178. Amplifier 186 of the type which includes automatic gain control responsive to current in line 188.

Indicated generally at 190 is a current mirror circuit which produces a current in line 188 that is directly related to the current in line 192. The current in line 192 may be varied by selectively turning on and off switching transistors indicated generally at 194. Each of the transistors has its base connected to a microcomputer output, all of which are indicated as the "gain control" microcomputer output in FIG. 2. Different combinations of the resistors which are on the collectors of each switching transistor may be placed in parallel with one another by turning selected transistors on or off to vary the current in line 192 thereby selectively adjusting the gain of amplifier 186 responsive to varying current in line 188.

The output of amplifier 186 is applied to a full wave rectifier 196 which produces only positive-going signals at its output. A switching transistor 198 has ts base connected to the sync signal generated by the microcomputer. Thus, any portion of the transducer firing pulse which remains on the output of full wave receiver 196 is grounded through transistor 198 since the transducer firing pulse always occurs during the sync pulse. Accordingly, only an amplified pulse generated by a reflected acoustic pulse appears on line 168.

Indicated generally at 200 is a voltage integrator. The output of the voltage integrator appears on line 202 which is connected to an analog-to-digital port on the microcomputer. Line 202 is labeled "signal strength" in the schematics of FIGS. 3 and 6. The output of the integrator is a signal which is proportional to the average over time of signals appearing on line 168 and thus provides an indication of the output level of amplifier 102. The microcomputer may be programmed by a person having ordinary skill in the art to respond to the output level by appropriately selecting various of transistors 194, via the gain signal control lines, thereby varying the gain of amplifier 186 in order to maintain the output of signal amplifier 102 within a preselected range. A signal representative of signal strength can also be converted to digital form by microcomputer 100 and provided by modem 114 to the surface electronics for monitoring by the operator. The signal strength signal can also be used to control relay 178 via line 184 from the microcomputer 100.

Indicated generally at 204 is a programmable low pass filter. Included therein is a commercially available, integrated circuit switching device, indicated generally at 206, which selectively inserts various of capacitors 208 between line 168 and ground thereby changing the characteristics of the filter. Different transducers, for example transducers 78, 80, can generate signals having different frequency components and therefore require different filtering. The microcomputer is programmed to provide signals to switching device 206 which select appropriate capacitors dependent upon which transducer is selected for pulsing.

The signal appearing on line 168 is an amplified version of the electrical pulse generated by transducer 114 responsive to a reflected acoustic pulse.

Figure 7:
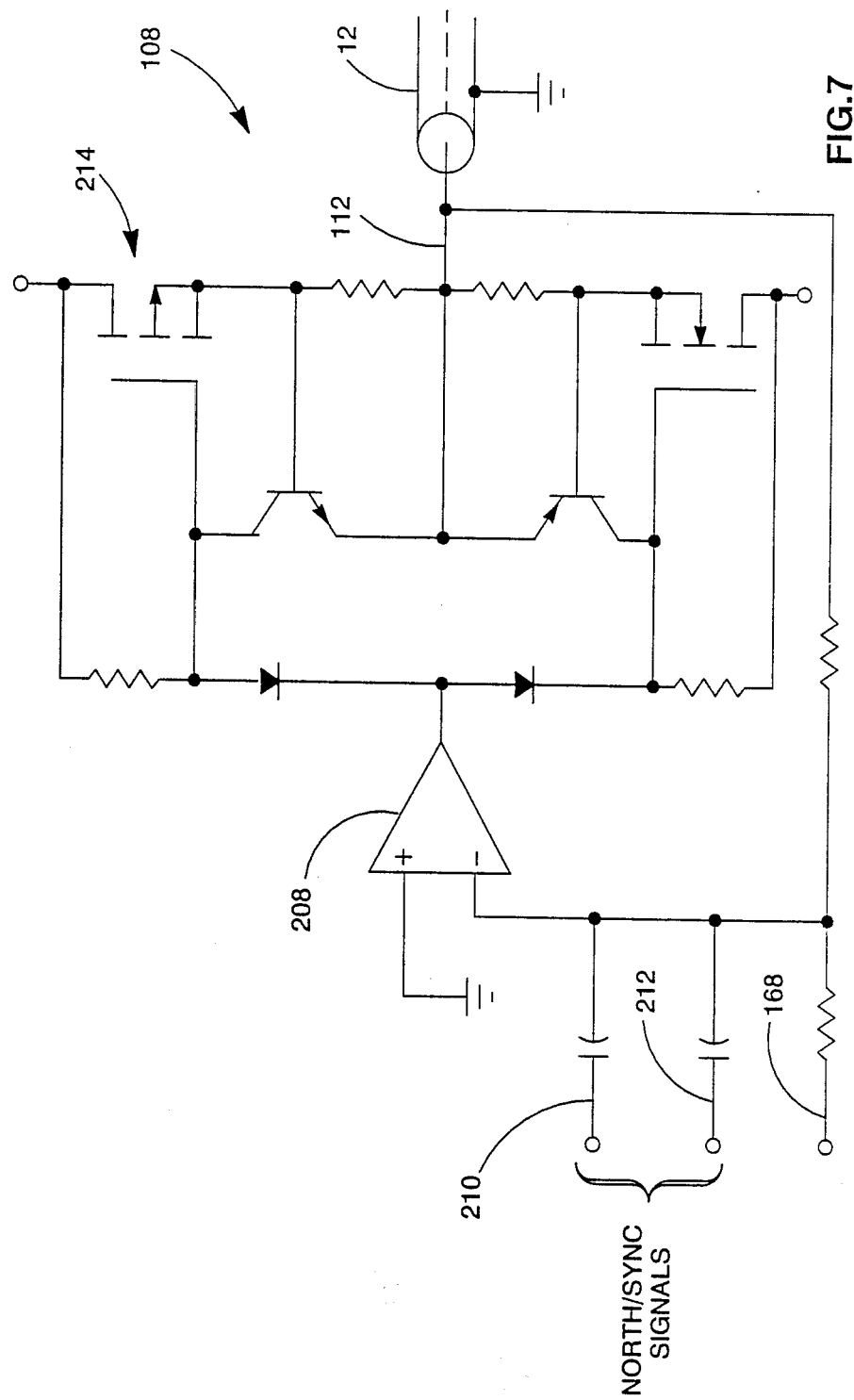
FIG. 7 is a schematic diagram of the mixer/buffer circuit shown in FIG. 3.

Considering now in detail the structure of mixer/buffer circuit 108, attention is directed to FIG. 7. Mixer/buffer circuit 108 receives information via conductors 210, 212 from the microcomputer relating to the north and sync signals and receives the output signal of reflected signal amplifier 102 on line 168. The mixer/buffer circuit generates a new signal containing information relating to the north and sync signals, sums this new signal with the output of the reflected signal amplifier and places the summed signal on line 112 for transmission to the surface on electrical cable 12 (shown in FIG. 1). Summing of the signals minimizes the number of conductors in cable 12. As will be seen, the signal appearing on line 112 contains information relating to the relative timing of the sync pulse, the start of which is coincident in time with the start of each generated acoustic pulse, and the electrical pulse produced by the reflected acoustic pulse as well as an amplified version of the electrical pulse itself. In addition, the signal generated by mixer/buffer circuit 108 provides an indication of the occurrence of each orientation pulse. From a signal such as that appearing on line 112, a video display of the borehole wall may be generated as is known to those skilled in the art.

Included in mixer/buffer circuit 108 is an amplifier 208. Amplifier 208 receives inputs from lines 210, 212, such being identified in the schematics of FIGS. 3 and 7 as lines carrying "north/sync signals." Each of lines 210, 212 is connected to a different microcomputer output, upon which appears a pulse responsive to the sync and north pulses. The output of amplifier 208 is applied to a current-limited amplifier indicated generally at 214. The output of the current-limited amplifier is applied to line 112 (also shown in FIG. 3) where it is summed with the output of reflected signal amplifier 102, which appears on line 168. (See also FIGS. 3 and 6). The signal on line 112 is then transmitted to the surface via cable 12 (see FIGS. 1, 2, and 7).

Current-limited amplifier 214 produces a voltage pulse which is applied to line 112 and which indicates the occurrence of a sync pulse. A signal G, shown in FIG. 8, appears on line 112, such being the output of mixer/buffer circuit 108. Signal G includes a first positive going pulse 218 and a second negative-going pulse 220 which together comprise a bipolar pulse. Because of the capacitance of cable 12, which may extend for as much as several thousand feet, if only a positive-going pulse is applied to the cable to designate the occurrence of the sync pulse, the cable must discharge over time. Such cable discharge may interfere with the amplified reflected pulse 222 which immediately follows the bipolar pulse in signal G of FIG. 8. Thus, it has been found that a bipolar pulse, which is driven first positively, then negatively, then to zero, discharges the cable and thereby prevents distortion of the amplified electrical pulse. Such a technique is illustrated in U.S. Pat. No.

4,649,550 for a telemetry scheme with slope modulated signal.

Figure 8:
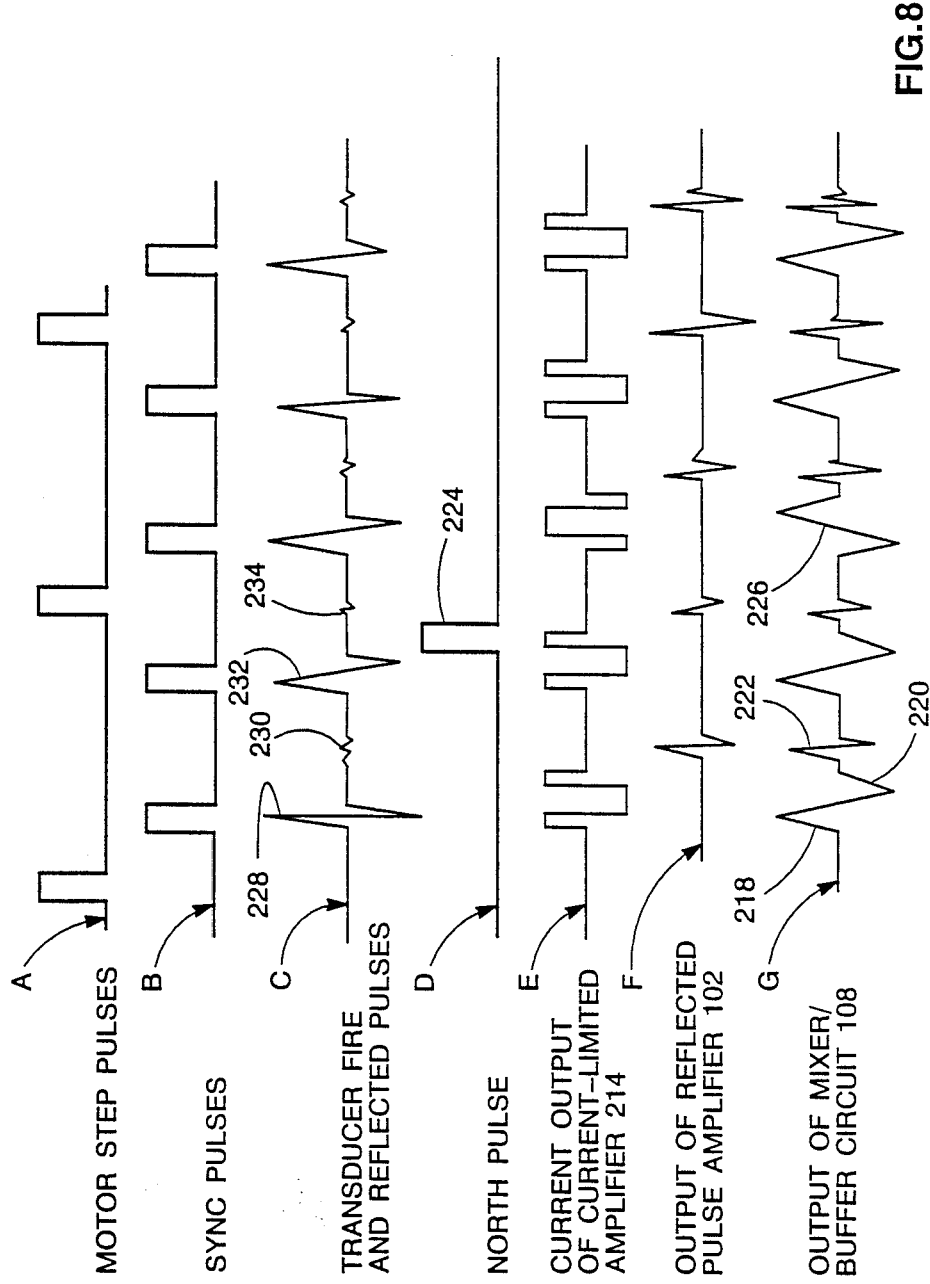
FIG. 8 is a chart showing certain signals generated by the circuitry shown in FIG. 3.

The pulsed signals applied to terminals 210, 212 drive amplifier 208 which in turn overdrives current-limited amplifier 214 to produce a current output signal E in FIG. 8. The microcomputer is programmed to so drive amplifier 208, responsive to the sync and north signals, thereby producing signal E as the current output of the amplifier. Such programming may be accomplished by a person having ordinary skill in the art.

It should be noted that when the microcomputer senses the occurrence of an orientation or north pulse, like pulse 224 in signal D of FIG. 8, it provides pulses on lines 210, 212 to invert the output of the current-limited amplifier. Thus, it can be seen that the third bipolar pulse 226 in signal G is inverted since it is the first pulse occurring after north pulse 224. Thus, when signal G is received at the surface, the inverted bipolar pulse can designate the occurrence of a north pulse as well as a sync pulse.

Considering now the operation of the tool, attention is directed to FIGS. 1 and 2. The device is suspended in borehole 10 on cable 12 in the configuration shown in FIGS. 1 and 2. The tool is typically lowered to a point in borehole 10 beneath a portion of the borehole to be logged. Thereafter, the cable is pulled from the borehole at a preselected rate thereby lifting the tool past the area of interest in the borehole.

While the tool is being so lifted, a signal from surface control circuit 13 is provided to modem 114 via electrical cable 12 and from there to microcomputer 100 to initiate borehole logging. Upon receipt of such a signal, the microcomputer provides a periodic motor step pulse, signal A in FIG. 8, to stepper motor sequencer/driver circuit 106. At the same time, the microcomputer provides a periodic sync pulse, signal B in FIG. 8, to timer/pulser circuit 104 and to reflected signal amplifier 102.

In FIG. 5, as each motor step pulse is applied to programmable logic device 162, drivers 164, 166 cause motor 50 to rotate by a predetermined angular amount. The frequency of the motor step pulses is directly proportional to the frequency of the sync pulses, signal B in FIG. 8, thereby assuring a constant number of sync pulses per stepper motor revolution. Since the frequency of the sync pulses controls the frequency of the acoustic pulses emitted by transducer assembly 58, there are a constant number of acoustic pulses per revolution of the transducer assembly. It is to be appreciated that appropriate commands from surface control circuit 13 can vary the frequency of signal A, the frequency of signal B, or both; however, the number of sync pulses per motor revolution remains constant for selected frequencies of signals A, B regardless of the speed of the motor or the frequency of the sync pulses. Such surface commands may be transmitted during logging thus enabling changing of acoustic pulsing frequency and scan rotation rate without interruption of logging.

While the motor is being so driven, the sync pulses are applied to line 124 of timer/pulser circuit 104 in FIG. 4 thereby applying a high voltage pulse of a duration selected by timer circuit 128 to transducer 80. The leading edge of each high voltage pulse is triggered by the leading edge of each sync pulse. The signal appearing on line 126 of timer/pulser circuit 104, which is also the input to reflected signal amplifier 102, is signal C in FIG. 8. Pulse 228 in signal C is the high voltage pulse generated by pulser circuit 130. The following pulse 230 is the electrical pulse generated by transducer 80 responsive to a reflected acoustic pulse striking the transducer. Thereafter, another high voltage pulse 232 appears with a following reflected electrical pulse 234 and so forth. Such pulsing and detection of reflected acoustic energy continues with each sync pulse in signal B triggering a corresponding high voltage pulse in signal C.

As will be recalled, reflected signal amplifier 102 deletes each transducer firing pulse, like pulses 228, 232 in signal C, and amplifies each electrical pulse with the resulting signal, signal F in FIG. 8, appearing on line 168 (in FIGS. 3 and 6). As previously described, the gain and filtration characteristics of pulse amplifier 102 are all adjustable responsive to microcomputer signals. The microcomputer is in turn responsive to commands generated by an operator at surface control circuit 13, thus providing means for varying operating characteristics of the downhole circuit without interruption of borehole scanning.

Mixer/buffer circuit 108 receives the amplified electrical pulse, signal F in FIG. 8, on line 168 and sums the same with a bipolar pulse indicative of the occurrence of the transducer fire pulse to produce an output on line 112, signal G in FIG. 8. A pulse is provided to the microcomputer from compass drive/detect circuit 110 each time transducer assembly 58 assumes the same rotational orientation with respect to the earth's magnetic flux lines. This pulse is indicated on the output of the mixer/buffer circuit by inversion of the first bipolar sync pulse occurring after the microcomputer detects a north pulse. Thus, bipolar pulse 226 in signal G, such being the first bipolar pulse occurring after north pulse 224 in signal D, is inverted.

Signal G is provided to the surface and may be used to generate a video display of the borehole or otherwise manipulated to extract information relating to the condition of the formation surrounding the borehole.

When modem 114 is not being used to transmit binary commands via line 118 from surface control circuit 13, line 116 from the microcomputer can place binary information on line 118 via modem 114 which permits monitoring various operating parameters of signal amplifier 102, e.g., gain, signal strength, etc. Thus, while receiving information relating to the condition of the borehole on line 112 (signal G in FIG. 8), the operating characteristics of the downhole control circuit may be monitored on line 118 and changed if desired by transmitting binary commands on line 118 to modem 114 and from there to the microcomputer.

It is thus seen that the present method and apparatus of the invention offers significant advantages over prior art methods and apparatus which use synchronous alternating current motors. A prior art synchronous motor is typically designed to operate at a single frequency of alternating current and when the motor operates at a different frequency, significant loss in motor torque occurs. Such characteristics, in addition to the extremely low start-up torque, require a complex gear train to enable the motor to start rotating the transducer and to enable changes in rotational transducer speed by changing gears which necessitates interruption of borehole scanning and raising the tool to the surface. Such gear trains can also be required due to the increased loading created by rotary transformers which can be used to transmit signals between the rotary transducer assembly and associated electronic circuitry in prior art systems.

In contrast, in the preferred embodiment of the instant invention, the transducer assembly is mounted on a shaft which is rotated directly by the motor shaft. The motor is rotated at a speed dependent upon the frequency of the drive signal. The torque of the motor is substantially constant between approximately 3 and 30 revolutions per second thereby enabling selection of a rotational speed based upon the desired borehole scanning rate rather than upon an upper limit at which the motor is capable of rotating the transducer assembly.

Because of the gear ratios necessary for a synchronous motor to drive a transducer assembly and the resulting gear friction losses, the upper rotational speed of the transducer assembly is limited thereby limiting the rate at which the tool may be advanced in a borehole to adequately scan the borehole wall. Since the upper rotational limit of the preferred embodiment of the invention is not so limited, the time for logging the borehole is substantially reduced.

A significant advantage imparted by the instant invention is the surface control of acoustic energy pulsing, transducer rotation rate and other operating characteristics of the downhole control circuit. A related advantage is the ability to monitor selected parameters, e.g., amplifier gain, of the downhole control circuit. Such surface control permits selectively varying acoustic pulsing frequency, acoustic pulse width, transducer rotation rate, etc. without interruption of borehole scanning. Such monitoring provides information to the operator for varying the operating characteristics to optimize logging quality and speed without bringing the logging tool to the surface.

It is to be appreciated that additions and modifications may be made to the method and apparatus of the instant invention without departing from the spirit of the same which is defined in the following claims.

What is claimed is:

1. A method for generating a signal containing information relating to the state of a borehole, said method being of the type in which acoustic energy pulses are transmitted from the central portion of the borehole toward the borehole wall in a plurality of radial directions and at a plurality of different depths thereby generating reflected acoustic pulses from a reflecting boundary adjacent the borehole which are indicative of the condition of the reflecting boundary, said method comprising the steps of:
    providing means in a downhole housing for substantially continuously rotating at a rate dependent upon a speed control signal supplied to said rotating means;
    providing a transducer assembly on said rotating means, said transducer assembly including means for generating such acoustic energy pulses and means for receiving such reflected acoustic pulses;
    generating in the housing a speed control signal for a selected controlled rate of substantially continuous rotation of the rotating means;
    providing the speed control signal to the rotating means;
    varying the rate of substantially continuous rotation of the rotating means while in the borehole; and
    generating and without interrupting scanning, varying the rate of generating periodic pulses firing signals for producing such acoustic energy pulses while in the borehole.

2. The method of claim 1 wherein the step of varying the rate of substantially continuous rotation of the rotating means includes maintaining a substantially constant torque.

3. The method of claim 1 wherein the step of varying the rotation rate of the rotating means comprises the steps of:
    generating a second speed control signal in the housing; and
    providing the second speed control signal to the rotating means.

4. The method of claim 1 wherein said speed control signal comprises a substantially square wave drive signal and wherein the step of varying the rotation rate of the rotating means comprises the step of:
    generating a second speed control signal having a frequency different from the first-mentioned speed control signal; and
    providing the second speed control signal to the rotation means.

5. The method of claim 1 wherein the step of generating a speed control signal comprises the steps of:
    generating a command signal for a selected controlled rotation rate of the rotating means, said command signal being generated on the surface adjacent said borehole;
    providing the command signal to the housing; and
    generating the speed control signal responsive to the command signal.

6. The method of claim 5 wherein the speed control signal comprises a substantially square wave drive signal and wherein the step of generating the speed control signal responsive to the command signal comprises the step of generating a speed control signal having a selected frequency.

7. The method of claim 1 wherein said rotating means comprises a motor having a shaft passing therethrough and wherein said method further comprises the step of transmitting a signal controlling the rate of acoustic energy pulsing through the shaft passing through the motor.

8. The method of claim 1 wherein the speed control signal comprises a substantially square wave drive signal and wherein said method further comprises the step of synchronizing said periodic pulsed firing signal and said speed control signal for generating a constant number of acoustic energy pulses per revolution of the rotating means.

9. The method of claim 1 wherein said transducer assembly is received in a housing and wherein the step of generating a periodic pulsed firing signal is performed in said housing.

10. The method of claim 9 wherein the step of varying the rate of generating a periodic pulsed firing signal comprises the steps of:
    generating a command signal for a selected rate of acoustic energy pulsing, said command signal being generated on the surface adjacent said borehole;
    providing the command signal to the downhole housing; and
    generating a second rate of periodic pulsed firing signal in response to the command signal.

11. A method for generating a signal containing information relating to the state of a borehole, said method being of the type in which acoustic energy pulses are transmitted from the central portion of the borehole toward the borehole wall in a plurality of radial directions and at a plurality of different depths thereby generating reflected acoustic pulses from a reflecting boundary adjacent the borehole which are indicative of the condition of the reflecting boundary, said method comprising the steps of:

provided means for rotating in a downhole housing;

providing a transducer assembly on said rotating means, said transducer assembly including means for generating such acoustic energy pulses and means for receiving such reflected acoustic pulses;

generating a command signal for a selected rate of acoustic pulsing, said command signal being generated on the surface adjacent said borehole;

providing the command signal to the downhole housing;

generating the periodic pulses firing signal in response to the command signal;

generating a second command signal for a second selected rate of acoustic energy pulsing different from the first selected rate of acoustic energy pulsing, said second command signal being generated on the surface adjacent said borehole;

providing the second command signal to the downhole housing; and generating a second rate of periodic pulsed firing signal in response to the second command signal.

12. A method for using a well logging device of the type having a motor driven by a substantially square wave drive signal and a transducer assembly mounted on the shaft of said motor, said method comprising the steps of:

generating a substantially square wave drive signal;
providing the drive signal to the motor;
generating a periodic pulsed firing signal;
providing the periodic pulsed firing signal to the transducer assembly thereby generating acoustic energy pulses;
advancing the motor along the axis of a wellbore with said transducer assembly oriented to radially transmit said acoustic energy pulses from the central portion of the wellbore toward the wellbore wall, said transducer assembly receiving reflected acoustic pulses from a reflecting boundary along a radial axis which are indicative of the condition of the reflecting boundary; and
varying the speed of substantially continuous rotation of said motor while maintaining a substantially constant torque.

13. The method of claim 12 wherein said method further comprises the step of varying the frequency of the drive signal thereby varying the rotational speed of said motor.

14. The method of claim 12 wherein the step of generating the drive signal is performed in the well bore adjacent the motor.

15. The method of claim 14 wherein the step of generating the drive signal is performed by a downhole control circuit which is electrically connected to a surface control circuit located on the surface adjacent said well bore and wherein said method further comprises the step of varying a selected parameter of the drive signal by generating a command signal at the surface control circuit which is communicated to the downhole control circuit.

16. The method of claim 15 wherein the step of varying a selected parameter of the drive signal comprises the step of varying the frequency of the drive signal thereby varying the rotational speed of the motor.

17. The method of claim 12 wherein said method further includes the step of varying the rate of the periodic pulsed firing signal thereby varying the rate of the acoustic energy pulses.

18. The method of claim 17 wherein the step of generating a periodic pulsed firing signal is performed in the well bore adjacent the motor.

19. The method of claim 18 wherein the step of generating the periodic pulsed firing signal is performed by a downhole control circuit which is electrically connected to a surface control circuit located on the surface adjacent the well bore and wherein said method further comprises the step of varying a selected parameter of the firing signal by generating a command signal at the surface control circuit which is communicated to the downhole control circuit.

20. The method of claim 19 wherein the step of varying a selected parameter of the firing signal comprises the step of varying the rate of the firing signal thereby varying the rate of the acoustic energy pulses.

21. The method of claim 12 wherein said method further includes the step of synchronizing said drive signal and said pulsed firing signal thereby providing a constant number of acoustic energy pulses for each revolution of said motor.

22. The method of claim 12 wherein said method further includes the steps of generating an electrical pulse relating to the acoustic energy of each reflected acoustic pulse.

23. The method of claim 22 wherein said method further includes the steps of:
generating an orientation pulse related to a geographic direction for each revolution of said motor; and
summing said orientation pulses, said firing signal pulses and said reflected electrical pulses.

24. The method of claim 12 wherein said method further includes the step of transmitting through the motor shaft a signal controlling the rate of acoustic energy pulsing.

25. Apparatus for logging a wellbore comprising:
a housing receivable in a wellbore;
means adjacent the housing for substantially continuously rotating at a rate dependent upon a drive signal supplied to said rotating means;
means for generating acoustic energy pulses responsive to a periodic pulsed firing signal, said means for generating acoustic energy pulses being mounted on said rotating means;
means in the housing for generating a substantially square wave drive signal operatively connected to said rotating means;
means for varying the frequency of said drive signal while in the wellbore, said frequency varying means being operatively connected to said means for generating a drive signal for supplying a speed control signal thereto;
means in the housing for generating a periodic pulsed firing signal operatively connected to said means for generating acoustic energy pulses;
means for advancing said rotating means along the axis of a wellbore, said means for generating acoustic energy pulses being oriented to radially transmit said acoustic energy pulses from the central portion of the wellbore toward the wellbore wall when said rotating means is so advanced; and
means for receiving reflected acoustic pulses mounted on said rotating means, said reflected acoustic pulses being reflected by a reflecting boundary along a radial wellbore axis and being indicative of the condition of the reflecting boundary.

26. The apparatus of claim 25 wherein said rotating means provides a substantially constant torque between approximately 3 and 30 revolutions per second.

27. The apparatus of claim 25 wherein said means for generating a periodic pulsed firing signal is received in said housing.

28. The apparatus of claim 27 wherein said means for generating a drive signal and for generating a periodic pulsed firing signal comprise a downhole control circuit.

29. The apparatus of claim 28 wherein said apparatus further includes:
a surface control circuit located on the surface adjacent said well bore;
means for electrically connecting said surface control circuit with said downhole control circuit; and
means for providing commands to said surface control circuit, said commands being operable to vary a selected parameter of said digital drive signal or said pulsed firing signal.

30. The apparatus of claim 25 wherein said apparatus further includes means for synchronizing said drive signal and said pulsed firing signal for varying the rate of pulsed firing signals while varying the frequency of the drive signal and providing a constant number of acoustic energy pulses for each revolution of said rotating means when said apparatus is in operative condition.

31. Apparatus for generating a signal containing information relating to the state of a borehole, said apparatus being of the type in which acoustic energy pulses are transmitted from the central portion of the borehole toward the borehole wall in a plurality of radial directions and at a plurality of different depths thereby generating reflected acoustic pulses from a reflecting boundary which are indicative of the condition of the reflecting boundary, said apparatus comprising:
means adjacent a housing for substantially continuously rotating responsive to a substantially square wave drive signal, the rotational speed of said rotating means being directly related to the frequency of said drive signal;
a transducer assembly mounted on said rotating means, said transducer assembly including means for generating such acoustic energy pulses and means for receiving such reflected pulses;
means in the housing for generating a substantially square wave drive signal operatively connected to said rotating means;
means for advancing said rotating means along the axis of said borehole;
means for varying the frequency of said drive signal while it the borehole;
means in the housing for providing a periodic pulsed firing signal to said transducer assembly for generating acoustic energy pulses; and
means for varying the rate of generating said periodic pulsed firing signals without interrupting scanning while in the borehole.

32. The apparatus of claim 31 wherein said rotating means provides a substantially constant torque between approximately 3 and 30 revolutions per second.

33. The apparatus of claim 31 wherein said apparatus further includes a downhole housing, said means for generating a drive signal and said rotating means being received in said housing.

34. The apparatus of claim 31 wherein said means for varying the frequency of said drive signal is included in a surface control circuit located on the surface adjacent said borehole.

35. The apparatus of claim 31 wherein said rotating means includes a motor having a shaft passing therethrough and wherein said apparatus further comprises:
a hole bored through said shaft along the longitudinal axis thereof;
slip ring means mounted on the end of said shaft opposite said transducer assembly; and
an electrical conductor received in said bore, said conductor electrically connected said transducer assembly with said slip ring means.

36. The apparatus of claim 31 wherein said apparatus further includes:
means for synchronizing said pulsed firing signal and said drive signal to provide a constant number of acoustic energy pulses for each revolution of said rotating means.

37. The apparatus of claim 36 wherein said apparatus further includes means for varying the rate of said pulsed firing signal.

38. The apparatus of claim 31 wherein said apparatus further includes:
means for providing a periodic pulsed firing signal to said transducer assembly for generating acoustic energy pulses; and
means for generating an electrical pulse related to the acoustic energy of each reflected acoustic pulse.

39. The apparatus of claim 38 wherein said apparatus further includes a downhole housing having said rotating means received therein and wherein said means for providing a periodic pulsed firing signal is included in a downhole control circuit received in said housing.

40. The apparatus of claim 39 wherein said apparatus further includes means for providing electrical signals to said downhole control circuit for varying the width or frequency of said firing signal pulses.

41. The apparatus of claim 40 wherein said apparatus further includes a surface control circuit located on the surface adjacent said borehole and wherein said downhole control circuit is electrically connected to said surface control circuit, said surface control circuit including means for providing electrical signals to said downhole control circuit.

42. The apparatus of claim 38 wherein said apparatus further includes:
means for generating an orientation pulse related to a geographic direction for each rotation of said rotating means; and
means for summing said orientation pulses, said firing signal pulses and said electrical pulses related to the acoustic energy of each reflected acoustic pulse.

43. The apparatus of claim 42 wherein said apparatus further includes means for substitution the first firing signal pulse occurring after said orientation pulse for a pulse having a polarity opposite to that of said firing signal pulses.

44. A method for using a well logging device of the type having a motor driven by a substantially square wave drive signal and a transducer assembly mounted on the shaft of said motor, said method comprising the steps of:
generating a substantially square wave drive signal;
providing the drive signal to the motor;
generating a periodic pulsed firing signal; providing the periodic pulsed firing signal to the transducer assembly thereby generating acoustic energy pulses;

advancing the motor along the axis of a wellbore with said transducer assembly oriented to radially transmit said acoustic energy pulses from the central portion of the wellbore toward the wellbore wall, said transducer assembly receiving reflected acoustic pulses from a reflecting boundary along a radial axis which are indicative of the condition of the reflecting boundary; and varying the speed of rotation of said motor while maintaining a substantially constant torque; and varying the rate of the periodic pulsed firing signal whereby varying the rate of the acoustic energy pulses.

45. The method of claim 44 wherein the step of generating a periodic pulsed firing signal is performed in the wellbore adjacent the motor.

46. The method of claim 45 wherein the step of generating the periodic pulsed firing signal is performed by a downhole control circuit which is electrically connected to a surface control circuit located on the surface adjacent the wellbore and wherein said method further comprises the steps of varying a selected parameter of the firing signal by generating a command signal at the surface control circuit which is communicated to the downhole control circuit.

47. The method of claim 46 wherein the step of varying a selected parameter of the firing signal comprises the step of varying the frequency of the firing signal thereby varying the frequency of he acoustic energy pulses.

* * * * *